(12) United States Patent
Kurth et al.

(10) Patent No.: US 10,883,605 B2
(45) Date of Patent: *Jan. 5, 2021

(54) SEAL ASSEMBLY

(71) Applicant: Aktiebolaget SKF, Gothenburg (SE)

(72) Inventors: Juergen Kurth, Odenthal (DE);
Christoph Passow, Leichlingen (DE)

(73) Assignee: Aktiebolaget SKF, Gothenburg (SE)

( * ) Notice: Subject to any disclaimer, the term of this patent is extended or adjusted under 35 U.S.C. 154(b) by 22 days.

This patent is subject to a terminal disclaimer.

(21) Appl. No.: 16/438,528

(22) Filed: Jun. 12, 2019

(65) Prior Publication Data

US 2019/0293182 A1  Sep. 26, 2019

Related U.S. Application Data

(63) Continuation of application No. 15/727,168, filed on Oct. 6, 2017, now Pat. No. 10,385,976.

(30) Foreign Application Priority Data

Oct. 17, 2016  (DE) .................. 10 2016 220 179

(51) Int. Cl.
*F16J 15/32*  (2016.01)
*F16J 15/34*  (2006.01)
*F16J 15/3244*  (2016.01)

(52) U.S. Cl.
CPC ....... *F16J 15/3464* (2013.01); *F16J 15/3244* (2013.01); *F16J 15/3404* (2013.01)

(58) Field of Classification Search
CPC ...... F16J 15/32; F16J 15/3204; F16J 15/3216; F16J 15/3224; F16J 15/324; F16J 15/3244; F16J 15/3248; F16J 15/3252
See application file for complete search history.

(56) References Cited

U.S. PATENT DOCUMENTS 5,692,757 A * 12/1997 Straub .................. F16J 15/3244
                                                    277/559
8,500,130 B2 * 8/2013 Sedlar .................. F16J 15/3224
                                                    277/559

(Continued)

FOREIGN PATENT DOCUMENTS

CN  101821536 A  9/2010
CN  103282702 A  9/2013

(Continued)

*Primary Examiner* — Gilbert Y Lee
(74) *Attorney, Agent, or Firm* — Garcia-Zamor Intellectual Property Law; Ruy Garcia-Zamor; Bryan Peckjian (57) ABSTRACT

A seal assembly for sealing a shaft configured to rotate in a main direction, the seal assembly including a stiffener and at least one elastomer seal member connected to the stiffener, the elastomer seal member including a seal region having a seal section configured to seal against a shaft and seal a to-be-sealed space, the seal section including a first screw thread web structure configured to pump a leakage fluid toward the to-be-sealed space when the shaft rotates in the main direction, a second annular, circumferentially extending web structure configured to sealingly abut on the shaft at least when the shaft is not rotating, and a third annular, circumferentially extending web structure configured to sealingly abut on the shaft at least when the shaft is not rotating, wherein the second web structure is axially spaced from the third web structure.

20 Claims, 5 Drawing Sheets

(56) References Cited

U.S. PATENT DOCUMENTS

2003/0085527 A1    5/2003  Hacker
2007/0187903 A1*  8/2007  Berdichevsky ...... F16J 15/3244
                                                           277/559
2010/0237567 A1*  9/2010  Kurth ................... F16J 15/3244
                                                           277/559

FOREIGN PATENT DOCUMENTS

| CN | 103282703 A | 9/2013 |
| --- | --- | --- |
| CN | 103906952 A | 7/2014 |
| CN | 104343986 A | 2/2015 |
| CN | 105402416 A | 3/2016 |
| DE | 102004020966 A1 | 11/2005 |
| DE | 102013207029 A1 | 10/2014 |
| JP | 2009144822 A | 7/2009 |

* cited by examiner

SEAL ASSEMBLY

CROSS-REFERENCE

This application is a Continuation of U.S. application Ser. No. 15/727,168 filed on Oct. 6, 2017, which claims priority to German patent application no. 102016220179.4 filed on Oct. 17, 2016, the contents of which are both fully incorporated herein by reference.

TECHNOLOGICAL FIELD

The disclosure is directed to a seal assembly for sealing a rotatable shaft.

BACKGROUND

In particular in internal combustion engines and transmissions in the automotive sector, particular requirements with respect to service life, low friction, and installation safety are placed on seal rings used there. A main direction of rotation is often present in such applications, i.e., the to-be-sealed shaft rotates predominantly in this main direction of rotation. A rotating in the opposite direction (so-called "reverse travel") then only occurs in a very short time period. In this regard in the development to date of seal elements for these applications a focus has been placed on the achieving of a high and reliable tightness with rotating in the main direction of rotation and with stationary shaft, while the tightness with reverse travel was often secondary.

For example, radial shaft seal rings are known including polytetrafluoroethylene (PTFE) and a spiral pumping structure, for example, for a synthetic oil of the internal combustion engine. The sliding properties of PTFE-based shaft seals can be improved by additives such as graphite or molybdenum sulfide. However, PTFE here is relatively inelastic, with the result that disadvantages arise with respect to the static tightness of corresponding shaft seals. It is thus known to close an existing seal gap with waxes or greases for pressure- and/or vacuum-tests of such shaft seals. These volatize in operation of the seal.

Improved seal assemblies have already been proposed that reduce such problems. Thus from DE 10 2007 036 625 A1 (a family member of US 2010/0237567) a seal element is proposed for sealing a shaft intended for rotating in a passage opening of a housing for the shaft, which seal element includes a stiffening part and an elastomer element connected thereto. The elastomer part comprises a first seal region for a static sealing abutment on the housing part, as well as a second seal region including a seal section configured and provided for sealing abutment on the shaft. The seal section includes a screw thread-type return pumping structure and a ring-type region, in the form of a closed line, lying on the free axial end. Due to the use of an elastomer the seal assembly has an increased elasticity, with the result that a pressure- and/or vacuum-testing is possible without applying additional materials onto the seal section. With the shaft rotating in the main direction, escaping leakage fluid is pumped by the return pumping structure toward the to-be-sealed space. In contrast, with a stationary shaft the ring-type region acts as a static seal.

Numerous proposed seal assemblies have the problem that a leakage results with a reversing of the shaft rotation direction. Solutions have also already been proposed for this problem. Thus in DE 10 2004 020 966 A1 (a family member of US 2005/0242521) a radial shaft seal is disclosed that is formed from an elastomeric material and includes a surface section that is provided with hydrodynamically acting return-pumping grooves for leakage liquid. These return-pumping grooves extend on the axial free end of the surface section in a seal bead. The return-pumping grooves are formed by inwardly directed cutting tips. For sufficient sealing the seal bead has a minimum contact width of 0.1 mm with the shaft. With the proposed seal assembly the contact width should be at most 0.8 mm, since otherwise a sufficient lubricating cannot be ensured. Due to this comparatively large contact width wear is increased.

SUMMARY

It is an aspect of the present disclosure to provide an improved seal assembly that has optimized dynamic and static seal properties and in addition is available to a wide range of applications with low wear and is manufacturable with little effort.

According to one advantageous embodiment of the disclosure a seal assembly is provided for sealing a shaft provided for rotating, comprising the following features:

a stiffening part and at least one elastomer part connected to the stiffening part, the elastomer part includes a seal region including a seal section configured for sealing a to-be-sealed space, the seal section includes a first screw thread-type web structure, using which a leakage fluid is pumpable back into the to-be-sealed space, the seal section includes a second web structure, extending in the circumferential direction and closed, (for example, an annular rib) that is provided for sealing abutment on the shaft at least with a not-rotating shaft, the seal section includes a third web structure extending in the circumferential direction and closed, (for example, an annular rib) that is provided for sealing abutment on the shaft at least with a non-rotating shaft, and the second web structure is disposed axially between the first and the third web structure and spaced axially from the third web structure.

With a rotating shaft, escaping leakage fluid can be pumped back in the to-be-sealed space by the first screw thread-type web structure. This is advantageous in particular with dynamic loading of the seal in applications wherein a main direction of rotation is present, since in this case leakage fluid is reliably pumped back even underneath the second and third web structure by a built-up pumping pressure.

Due to the second and third web structures, extending in the circumferential direction and closed, and in particular their axial spacing, both a static sealing with stationary shaft and a sufficient dynamic sealing in the case of a shaft temporarily rotating against the main direction of rotation are possible. The thus cascadingly disposed, respectively closed web structures sufficiently hold back escaping leakage fluid independent of the direction of rotation. In the static case, i.e., with stationary shaft, both web structures sealingly abut on the shaft with the result that in this case no leakage fluid can escape. Due to the providing of two such web structures with axial spacing, even with a leakage of one of the web structures a temporary reliable sealing is ensured by the other encircling web structure. Due to the axial spacing of the second and third web structure a reservoir can form between them, wherein small amounts of leakage fluid can collect.

In known seals a single seal bead is already known as a static seal with a stationary shaft, to which a return-pumping structure connects, often embodied as a single- or multi-start spiral of a single direction of rotation. In the dynamic case with rotating of the shaft against the main direction, such an assembly cannot ensure a reliable sealing. Such return-pumping structures only have the desired pumping effect toward the to-be-sealed space with rotating of the shaft in the main direction. With rotating against the main direction (the so-called "reverse travel"), however, such a structure unavoidably has an undesired pumping effect toward the environment. Escaping leakage fluid is thus pumped toward the environment. In the dynamic case of the rotating shaft it is necessary that the seal bead is lubricated by a thin oil film. Otherwise heavy wear of the seal would occur due to the increased friction. The pumping structure connecting to the seal bead then has the effect of actively pumping oil standing below the seal bead actively away from it toward the environment. The leakage is thereby even actively increased. The disclosure avoids this disadvantage by providing the axially spaced third web structure, which is in direct operative connection with the first, screw thread-type web structure. In contrast, the second web structure directly axially abuts on the first web structure. It is thus in operative connection with the first web structure.

In the case of the shaft rotating against the main direction the cascadingly disposed second and third web structure sufficiently delay a leakage, since escaping leakage fluid initially collects in the reservoir. The reservoir can be dimensioned according to the application such that with typical time durations of a return travel and an assumed leakage it does not completely fill, with the result that no leakage fluid can pass under the second web structure and thus into the environment. With the rotating in the main direction inevitably following after the reverse travel, escaped leakage fluid is actively pumped by the first web structure back underneath the second web structure into the reservoir and pumped with the leakage fluid collected there back under the third web structure into the to-be-sealed space. A leakage is thus reliably prevented.

In one advantageous embodiment of the disclosure the seal section is formed in the region of a free axial end such that in the installed state of the seal assembly the third web structure is pressed onto the shaft with a first radial force (the so-called "contact pressure"), which is smaller than a second radial force with which the second web structure is pressed onto the shaft. Preferably the first radial force is between 40% and 70% smaller than the second radial force. Due to the elastic material chosen the radial forces with which the web structures are pressed onto the shaft are typically subject to fluctuations that arise due to the distribution of a radial force acting on the first web structure. Thus a total radial force exerted overall by the elasticity of the material on all web structures is distributed somewhat differently on the different web structures at different angular positions along the circumference in the respective axial extension along the shaft, since the screw thread-type first web structure has contact with the shaft at every angular position at different axial positions. It is relevant that the first radial force is smaller along the entire circumference than the second radial force. This has the positive effect that the leakage fluid can be more easily pumped back under the third web structure into the to-be-sealed space than it can pass through the second web structure toward the environment.

In one advantageous design of the disclosure the seal section in the region of the first web structure is configured such that the first web structure is pressed onto the shaft along its extension with varying radial force distribution, wherein a maximum of the radial force occurs at a position of the first web structure that is axially spaced from the second web structure. The radial force preferably initially increases toward the second web structure, with the result that each winding of the web structure is pressed onto the shaft with a higher radial force than the previous one. After exceeding a maximum radial force in an axial spacing to the second web structure the radial force decreases again. This causes an optimized pumping effect of the first web structure.

In one advantageous design of the disclosure a groove-type recess extending in the seal section in the circumferential direction is located between the second and third web. This recess serves as a defined reservoir for leakage fluid passing through the third web structure in the static or dynamic case, in particular with the shaft rotating backwards. The dimensioning of the recess can be adapted in a simple manner according to the intended application.

In one advantageous design of the disclosure, in the not-installed state of the seal assembly the inner diameter of the first web structure continuously decreases toward one free axial end, the inner diameter of the second web structure is smaller than the smallest inner diameter of the first web structure, and the inner diameter of the third web structure is smaller than the inner diameter of the second web structure. The decrease of the inner diameter toward the free axial end is preferably linear. The decrease of the inner diameter preferably occurs by a factor in the range between 0.5 and 1.0, particularly preferably of 0.8. That is, for example, with an axial viewing distance of two inner diameters of 1 mm, the inner diameters differ by 0.8 mm, i.e., decrease by 0.8 mm per millimeter of axial offset. This corresponds to an opening angle of a cone of approximately 45° or of 22.5° with respect to the main axis of the seal assembly. With this decrease, in the installed state a preferred pressure distribution arises with web structures abutting on the shaft, which leads to low wear with simultaneously high tightness.

In one advantageous design of the disclosure, in the installed state of the seal assembly the inner diameters of the web structures decrease linearly toward one free axial end of the seal section. The surfaces of the web structures lie on a cone tapering toward the free axial end. With installed seal assembly a defined course of the radial forces can thereby be achieved and thus an optimizing of the seal effect.

In one advantageous design of the disclosure the axial spacing of the second and third web structure falls between 40% and 60% of the pitch of the screw thread of the first web structure. The spacing preferably falls at 50%. For example, the axial spacing is 0.35 mm with a screw thread pitch of 0.7 mm. This results in an optimal size of the reservoir thus formed for leakage fluid in conjunction with the return-pumping effect of the first web structure.

In one advantageous design of the disclosure the third web structure is associated with a free axial end of the seal section. The axial free end is the end of the sealing section that lies toward the to-be-sealed space. A connecting point of the elastomer part lies axially opposed to the stiffening part. The screw thread depth of the first web structure preferably decreases in the extension toward the second web structure and is configured merging into the second web structure. Due to this assembly, in particular in the dynamic case of the rotating of the shaft in the main direction the hydrodynamic return pumping of leakage fluid can be optimized. The decreasing screw thread depth and the transition into the second web structure generates an increasing pressure in the screw thread toward the second web structure, which pressure is sufficiently large to pump leakage fluid back under the second web structure into the reservoir. If the reservoir between the second and third web structure is filled with leakage fluid, and if further leakage fluid is pumped back by the first web structure, then leakage fluid is also pumped under the third web structure back into the to-be-sealed space.

In one advantageous design of the disclosure the web structures are formed on the seal section from webs disposed there, wherein the webs have similar cross-sections. Such a seal assembly is particularly cost-effective and manufacturable with higher precision, which is described further below. Thus the relevant surface structure of a vulcanizing tool can preferably be manufactured in a single operation using a single cutting plate, with the result that the structures can be generated as accurately as possible. A setting down or even a changing of the cutting plate is not required. Seal assemblies manufactured using this cutting tool are consequently also very accurately manufactured, with the result that increased leakages due to imprecisions in manufacturing are precluded.

In one advantageous design of the disclosure the cross-section of the webs is configured triangular, wherein the triangular profile has such a shape that an asymmetric pressure distribution is present in the sealing contact to the shaft such that even with rotating of the shaft against the main direction a pumping effect is achievable. Due to the asymmetric design of the cross-section of the webs, even with the shaft rotating against the main direction, wherein the screw thread-type first web structure achieves no pumping effect or an undesired pumping effect as described above, the second and third web structure already achieve a return-pumping effect, with the result that leakage fluid is pumped back into the to-be-sealed space. Since the time duration of the backward rotating shaft is usually significantly smaller, this pumping effect of the second and third web structure can be typically be significantly lesser than that of the first web structure with the shaft rotating in the main rotational direction.

In one advantageous design of the disclosure a first leg of the triangular cross-section, which lies on the side of the free axial end of the seal section, is configured with a smaller inclination with respect to the shaft main axis than the second, axially opposing leg. Such a symmetrically configured triangular shape reliably ensures a sufficiently asymmetric pressure distribution in the seal contact to the shaft, with the result that the pumping effect just described is achieved in a simple manner.

The first leg preferably encloses an angle α with the shaft main axis or the surface thereof that falls between 40° and 90°. The second leg encloses an angle β with the shaft main axis or the shaft surface that falls between 5° and 35°. Here α preferably falls between 55° and 80°, still more preferably at 75°. In contrast, β optimally falls between 15° and 20°, still more preferably at 15°. With such embodiments of the angle the asymmetric pressure distribution is greatest with respect to its pumping effect.

In one advantageous design of the disclosure the triangular cross-section has a rounded shape at the tip with which the web sealingly abuts on the shaft. This preferably has a radius between 0.03 and 0.1 mm, particularly preferably of 0.05 mm. With a typical local radial force on the web structures in the range of 0.4 to 3 N an optimal contact pressure thereby arises of the web onto the shaft with a very low contact area. Thus with such a seal assembly the friction can be significantly reduced compared to known seal assemblies, wherein due to the configuration of the three corresponding web structures the seal behavior is also optimized by the distribution of the total radial force.

Further advantages, features, and details of the disclosure arise from the exemplary embodiments of the invention described below with reference to the Figures.

DETAILED DESCRIPTION

Figure 1:
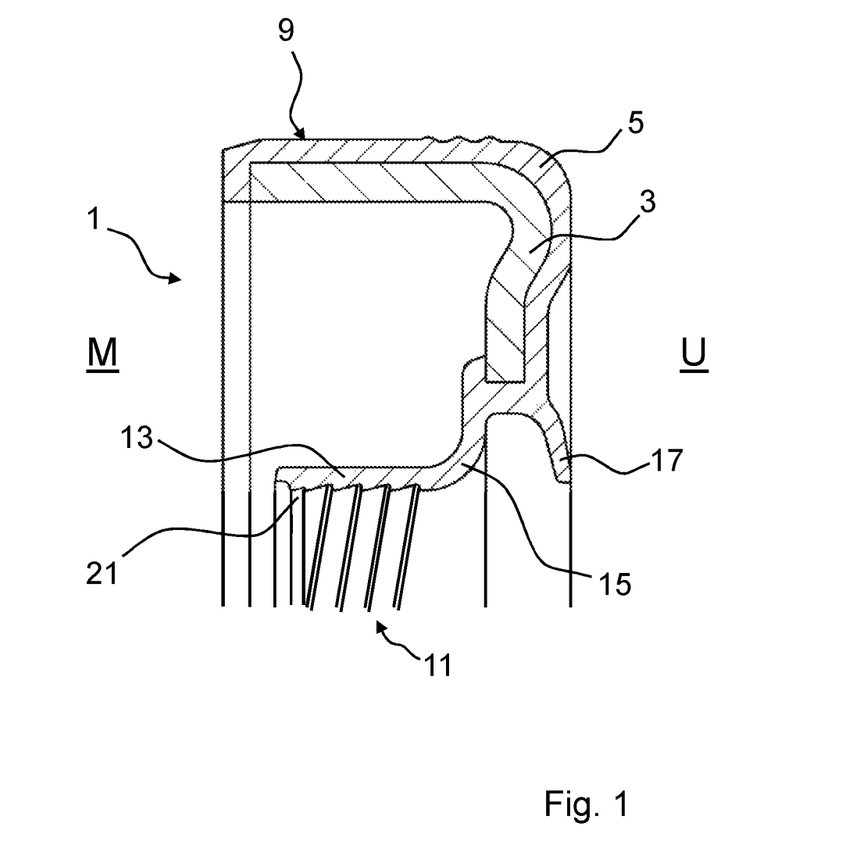
FIG. 1 shows a longitudinal section through an upper half of an embodiment of the disclosure.

FIG. 1 shows, as an exemplary embodiment of the disclosure, a longitudinal section through an upper half of a seal element 1 in a first embodiment. The depiction shows the seal element 1 in the installed state, wherein a housing and a shaft are not shown for better clarity. The ring-shaped seal element 1 comprises a first stiffening part (stiffener) 3, which is typically manufactured from a metallic plate. The seal element 1 further comprises an elastomer part 5 connected to the stiffening part 3. The elastomer part 5 is formed from an elastomer material, in particular a fluoroelastomer, and connected to the stiffening part 3 by a vulcanizing.

Here the elastomer part 5 comprises a seal region 9 whose outer surface is configured for statically sealing abutment on the not-depicted housing part in the region of a passage opening for the to-be-sealed, not-depicted shaft. Here, for example, it is the housing of an internal combustion engine, wherein a to-be-sealed oil space M of the motor is disposed on the left side of FIG. 1 and an air side U, for example, associated with the surrounding atmosphere, is located on the right side of FIG. 1.

The elastomer part 5 further comprises a second seal region 11 that with intended installation of the seal element 1, as depicted in FIG. 1, comprises an essentially hollow-cylindrical seal section 13 abutting on the shaft. This then merges toward the right side into a section 15 expanding in a trumpet-shaped manner. In the embodiment depicted the trumpet-shaped section 15 thus protrudes into the oil space M with its cross-section decreasing into the oil space M. Finally the elastomer part 5 includes a second seal lip 17 toward the air side U. This has no contact to the shaft and keeps coarse contaminants away from the seal region 11.

Here at least the inner surface of the hollow-cylindrical seal section 13 is formed with the screw thread-type return-pumping structure, which with a rotating of the shaft with the intended main rotational direction exerts a reverse-pumping effect on oil penetrating between the shaft and the seal section 13.

On the left end of the seal section 13 in the depiction in FIG. 1, i.e., on the free axial end, the screw thread of the return-pumping structure ends at a circular-ring-type, radially encircling, closed region 21, including a circular-cylinder-casing-type inner wall, of the seal section 13, whose design will be explained in detail with reference to FIGS. 2 and 3.

Figure 2:
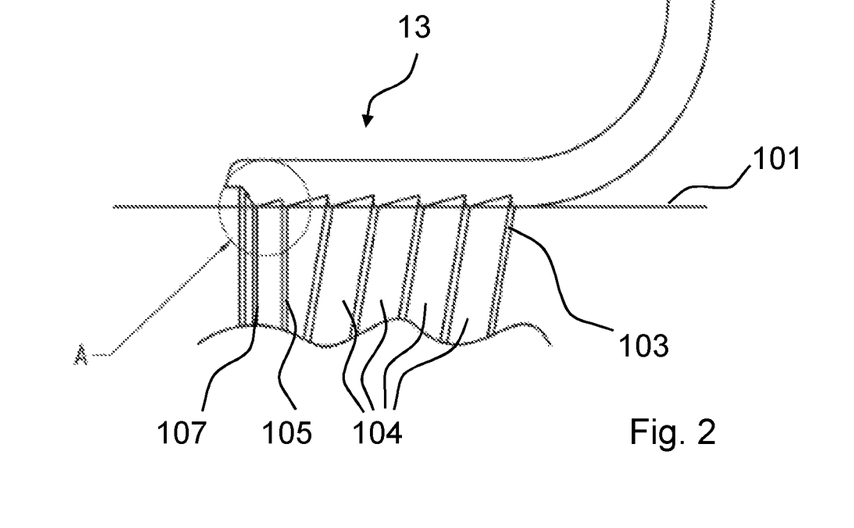
FIG. 2 shows a sectional enlargement of the seal section of the embodiment according to FIG. 1 in the installed state.

A sectional enlargement of the seal region 13 of the embodiment of FIG. 1 is depicted in FIG. 2. Here for illustration of significant aspects of the disclosure the contact of the seal region with the shaft (not depicted) is indicated by a line 101 without covering the essential structure of the seal region 13. The seal region 13 includes a first web structure that is embodied as a screw thread-type return-pumping structure 103. The seal region 13 furthermore includes a second web structure and a third web structure that are each embodied in closed webs 105 and 107 extending in the circumferential direction. The webs 105 and 107 are disposed axially spaced, wherein the web 107 is associated with the axial end of the sealing region 13, while the web 105 is disposed on the end of the return-pumping structure. Consequently the web 105 lies between the return-pumping structure 103 and the web 107.

At least with a non-rotating shaft the webs 105 and 107 are provided for sealing abutment on the shaft. Here in conjunction with the material properties of the elastomer they form the prerequisite that even with a non-rotating shaft the seal element abuts on the shaft in a gas- and fluid-tight manner, with the result that, for example, for monitoring of the correct installation of the seal element and the seal effect of the internal combustion engine in the context of the assembly process a pressure- and/or vacuum testing can be undertaken without further materials having to be applied between the seal section 13 and the shaft.

The screw thread of the return-pumping structure 103 merges into the web 105 such that the width and depth of a groove 104 defined by the return-pumping structure 103 decrease with a profile remaining equally proportioned. This has the positive effect that with relatively simple manufacturability the return-pumping effect is positively influenced to the effect that with a rotating shaft a pressure increase is generated in the leakage fluid to be pumped back, with the result that leakage fluid is reliably pumped back underneath the web 105. The detailed design and the interaction of the webs 105 and 107 are explained in detail with reference to FIG. 3.

Figure 3:
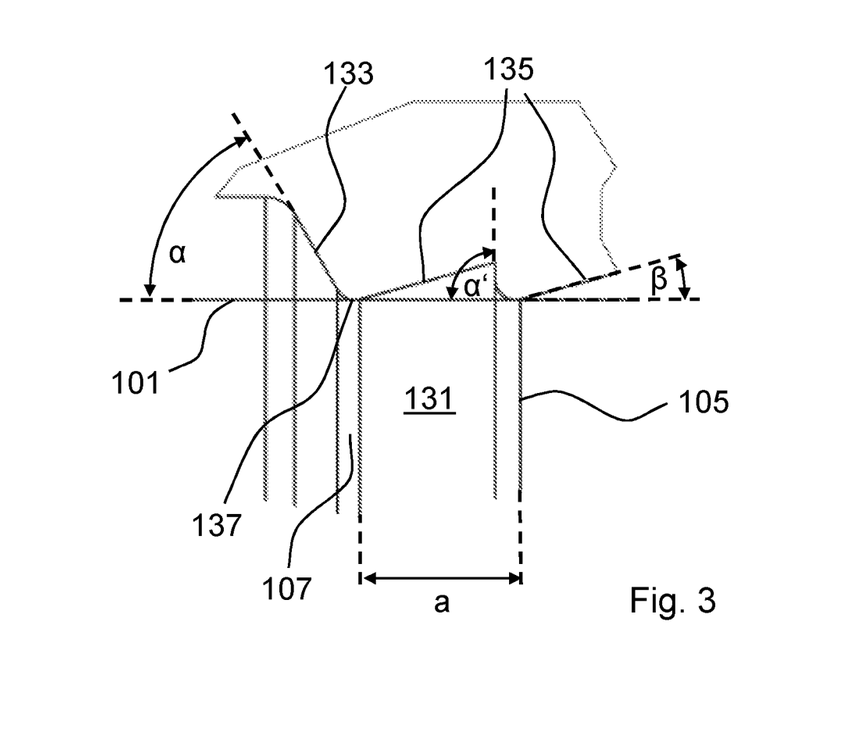
FIG. 3 shows a sectional enlargement of the axial end of the seal section.

The region A of the embodiment of the seal assembly of FIG. 2 is depicted enlarged in FIG. 3. Here in particular the two self-enclosed webs 105 and 107 can be seen in detail. Between the two axially spaced webs 105 and 107 a recess 131 is formed that forms a reservoir for escaping or pumped-back leakage fluid. The webs 105 and 107 have a spacing a whose size is between 40% and 60% of the screw thread pitch of the return-pumping structure 103. Here an optimal volume of the reservoir arises with respect to the selected pumping capacity of the return-pumping structure 103.

The webs 105 and 107, as well as the return-pumping structure 103, have a similar cross-section geometry, wherein this is configured triangular and respectively includes two legs 133 and 135 and a rounded tip lying between them, which is illustrated in an exemplary manner with reference to the web 107. With the rounded tip 137 the seal respectively abuts on the surface of the shaft, which here in turn is indicated by the line 101. The radius of the tip 137 preferably falls between 0.03 and 0.10 mm, whereby a very small contact surface arises with the surface of the shaft and thus a lowest possible friction between the seal and the shaft. Ideally the radius of the rounded tip falls at 0.05 mm. Here there is an optimal ratio between contact width of the seal with the shaft and the prevailing friction or seal effect. Due to the flexibility or stiffness of the elastomer part 5, in one exemplary design of the seal a predominant total radial force results of approximately 5 N along an axial line lying on the shaft, such as, for example, the line 101. This total radial force is distributed on the surface tips of the webs 105 and 107, which surface tips are along the line in contact with the shaft, as well as the return-pumping structure 103, which typically leads to local radial forces in the range of 0.4 to 3 N, which act on the rounded tip. These local radial forces lead only to a very slight flattening of the seal cross-section due to pressure on the shaft, with the result that in operation the contact width is optimized and comparatively small.

With the webs 105 and 107 and the return-pumping structure 103, the leg 135 pointing toward the environment encloses an angle β with the surface or the main axis of rotation of the shaft. The angle β preferably falls between 5° and 35°. Particularly preferably β falls between 15° and 20°. In typical application cases in the automotive field β optimally falls at 15°. The optimum angle β here can by all means vary between different applications. The opposite leg 133 of the triangular cross-section structure encloses an angle α with the surface or axis of rotation of the shaft that is preferably between 40° and 90°. Particularly preferably the angle α falls between 55° and 80°. In a typical application with the webs 105 and 107 α optimally falls at 75°, it is thus equal for all. Alternatively as in the exemplary embodiment of the disclosure shown in FIG. 3 α can fall at 45° only with web 107; however with 105 and with the return-pumping structure 103 at barely 80°. By the selection of different sized angles α and β, with the abutting of the web on the shaft an asymmetric pressure distribution on the contact surface is generated which leads to an active return pumping of leakage fluid. This is relevant in particular if with a shaft rotating against the main direction of rotation a tendency arises in the fluid to pass underneath the web 107. In the case of the shaft rotating against the main direction of rotation the return-pumping structure 103 has no return-pumping effect. Rather, in this case the return-pumping structure 103 even pumps the fluid actively toward the environment U. Therefore it must be ensured by the webs 105 and 107 alone that no leakage fluid can reach the environment U. Here most of the leakage fluid is already retained or actively pumped back into oil space M by the optimization of the web 107. Although with the shaft rotating against the main direction of rotation the pumping capacity of the entire seal section 13 is significantly reduced, compared to the other case of the shaft rotating in the main direction of rotation, by the elimination of the effect of the return-pumping structure 103, the significantly lower amount of leakage fluid then due in particular to the significantly shorter time duration of the rotation and the lower rotational speeds is in this case nonetheless sufficient.

The leakage fluid nevertheless escapes under certain circumstances due to the very small and thereby friction-optimized contact width of the web 107 with the shaft and collects in the recess 131 between the webs 105 and 107. There it is pumped back in turn by the optimized geometry of the web 105 toward the web 107 and thus toward the oil space M. The webs 105 and 107 cascadingly disposed in this manner thus ensure in an improved manner that even with the shaft temporarily rotating against the main direction no leakage fluid can reach the environment U. Here at the same time a small contact width of the webs 105 and 107 with the shaft and thus a friction-optimized seal is given. Known seals including only one web are for this purpose only insufficient or sufficient due to an increased friction, for example as a consequence of a larger contact surface in the position.

Figure 4:
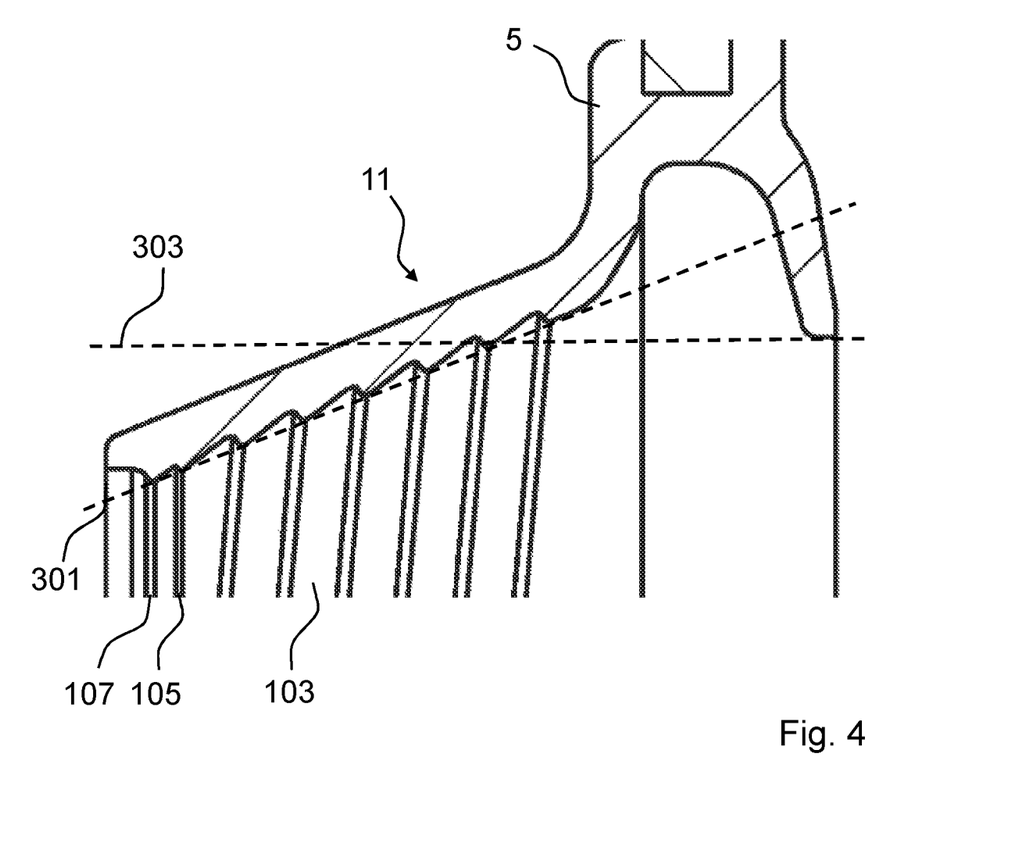
FIG. 4 shows a sectional enlargement of the seal section of the embodiment according to FIG. 1 in the not-installed state.

A similar embodiment to those in FIGS. 1 to 3 is sectionally depicted in FIG. 4; however here in the not-installed state. In contrast to the depiction of the installed state in FIGS. 1 to 3, here the geometry of the elastomer part 5 can be seen in particular in the region of the seal region 11. This tapers in a cone-shaped manner toward the free axial end, which is illustrated by the line 301. Accordingly the surfaces of the webs 105 and 107, as well as the return-pumping structure 103, lie on the surface of a corresponding cone. The inner diameter of the return-pumping structure 103 consequently decreases linearly in the axial direction. The inner diameter of the web 105 is correspondingly even smaller, while the inner diameter of the web 107 is smallest.

The line 303 indicates the surface of a not-depicted shaft on which the webs 105 and 107, as well as partially the return-pumping structure 103, abut in the installed state. It is clear that an increasing widening of the elastomer part 5 along the axial extension of the seal region 11 results from the installation of the seal assembly. Due to the elasticity of the elastomer part 5 this results in a total radial force by which the webs 105 and 107 and the return-pumping structure 103 are pressed onto the shaft. A local radial force ("contact pressure") respectively acts on the webs 105 and 107 and the return-pumping structure 103; the size varies due to the geometry of the webs 105 and 107 and of the return-pumping structure. The webs 105 and 107 lie axially at the same position along each imaginary axially extending line on the shaft, such as, for example, the line 103. In contrast, due to the screw thread-type structure the axial position of the webs of the pumping structure 103 is different with each angular position of the line along the circumference of the shaft. Thus with different angular positions a different distribution of the total radial force arises on the different webs. The local radial force has a maximum in the axial extension that, with each angular position, lies in the region of the return-pumping structure. Accordingly the local radial force acting on the web 105 is lower than this maximum. The local radial force acting on the web 107 is in turn lower than the maximum and than the local radial force acting on the web 105. In direct comparison the web 107 is pressed less onto the shaft than the web 105, and this in turn less than the tip of the return-pumping structure 103 that is pressed onto the shaft with maximum force. This combination of local radial forces is optimized with respect to the pumping behavior with the shaft rotating in the main direction, the pumping behavior with the shaft rotating against the main direction, and the wear.

The described seal assembly additionally has the advantage that it is manufacturable in a particularly simple manner. Usually the elastomer part 5 used is produced by injection molding using a tool that has the shape as a cavity of the seal assembly to be produced. In a known manner elastomer is introduced in the cavity and vulcanized. The manufacturing of the tool is very complex and associated with high costs. Here, for example, metal parts are machined and brought into the desired shape, which assembled form the cavity. For this purpose the required structure of the webs or recess in one of the metal parts are manufactured using a plurality of cutting tools. The cutting plates have different geometries in order to be able to manufacture the often-different geometries of the webs. The cutting plates are subsequently advanced to the metal part while it is rotating so that a machining results. Due to the small dimensions of the webs, with each change of the cutting tool high requirements are placed on the precision of the new position of the cutting tool. Generally this results in deviations from the desired geometry. The inaccuracies thus resulting transfer to the manufactured seal assembly, which can impair its reliability in operation.

In the preferred embodiment of the disclosure the cross-sectional geometry of the spiral return-pumping structure 103 as well as that of the two encircling webs 105 and 107 are designed such that the corresponding shaped part of the tool can be produced using only a single cutting plate in a single continuous manufacturing process. A setting down of the cutting tool for changing thereof is not required. Both the exact shape and position of the return-pumping structure 103 and the two webs 105 and 107 with respect to each other is thereby ensured, since in contrast to the manufacturing of known vulcanizing tools the cutting plate need not be changed, whereby the manufacturing process is not interrupted. In addition, due to the essentially identical geometry all webs can be manufactured using the same cutting plate. Thus in particular due to the very small radii of the rounded tips an optimal pressure distribution is also ensured and even the smallest error in the manufacture of the vulcanizing tool and thus of the elastomer is precluded.

Figure 5:
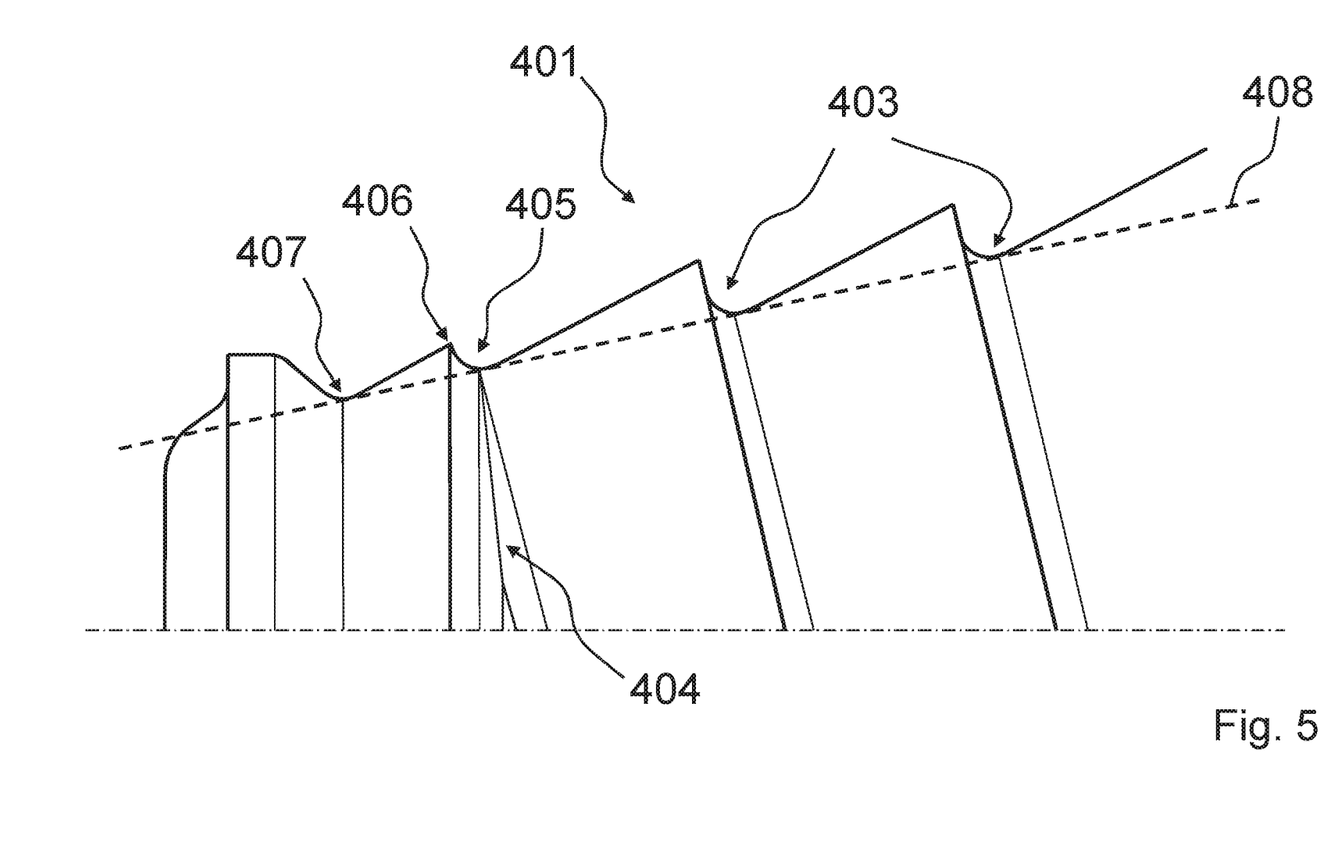
FIG. 5 shows a section of a mold part for manufacturing an embodiment of the disclosure, and FIG. 6 schematically shows a part of the manufacturing process of a vulcanizing tool for the embodiment of the disclosure.

In FIG. 5 a section of a shaped part 401 is schematically depicted. Using the shaped part 401, seal assemblies according to the disclosure can be manufactured with known methods. For example, such seals are manufactured by vulcanizing in the injection molding method. Externally and radially encircling, the shaped part 401 has the inverse structure of the seal region 11 of the elastomer part 5 of the seal assembly 1 according to FIGS. 1 to 4. The structure accordingly comprises a spiral groove 403 tapering axially leftward having a defined contour by which the return-pumping structure 103 is formed by filling with elastomer during the vulcanizing process. In this respect the geometry of the groove 403 corresponds exactly to the geometry of the web of the return-pumping structure 103. The groove 403 ends in a region 404 in a groove 405 extending in the circumferential direction, whose geometry in turn corresponds to the geometry of the web 105. Axially spaced there is a further groove 407 extending in the circumferential direction whose geometry in turn corresponds to the geometry of the web 107. An elevation 406 lying therebetween has the geometry of the recess 131.

The shaped part 401 tapers in a cone-shaped manner in the axial direction, which is illustrated by the line 408. In particular the deepest points of the grooves 403, 405, and 407 lie on the outer surface of a corresponding cone. Accordingly the grooves 403, 405, and 407 have different inner diameters with respect to the circumferential direction, wherein due to the spiral course the inner diameter of the groove 403 continuously decreases and the groove 407 has the smallest diameter. In the not-installed state a seal assembly thereby manufactured also tapers in a cone-shaped manner toward the free axial end. In an analogous manner the inner diameters of the webs 105 decrease, as well as the radius of the return-pumping structure 103. In contrast, in the installed state of the seal assembly the webs 105 and 107 arising from the grooves, as well as the return-pumping structure 103, are widened by the shaft, which due to the elasticity of the elastomer leads to a radial force. The webs 105 and 107 are sealingly pressed by this onto the shaft. In typical applications the return-pumping structure 103 abuts only partially on the shaft, for example, on the first three windings starting with web 105.

Figure 6:
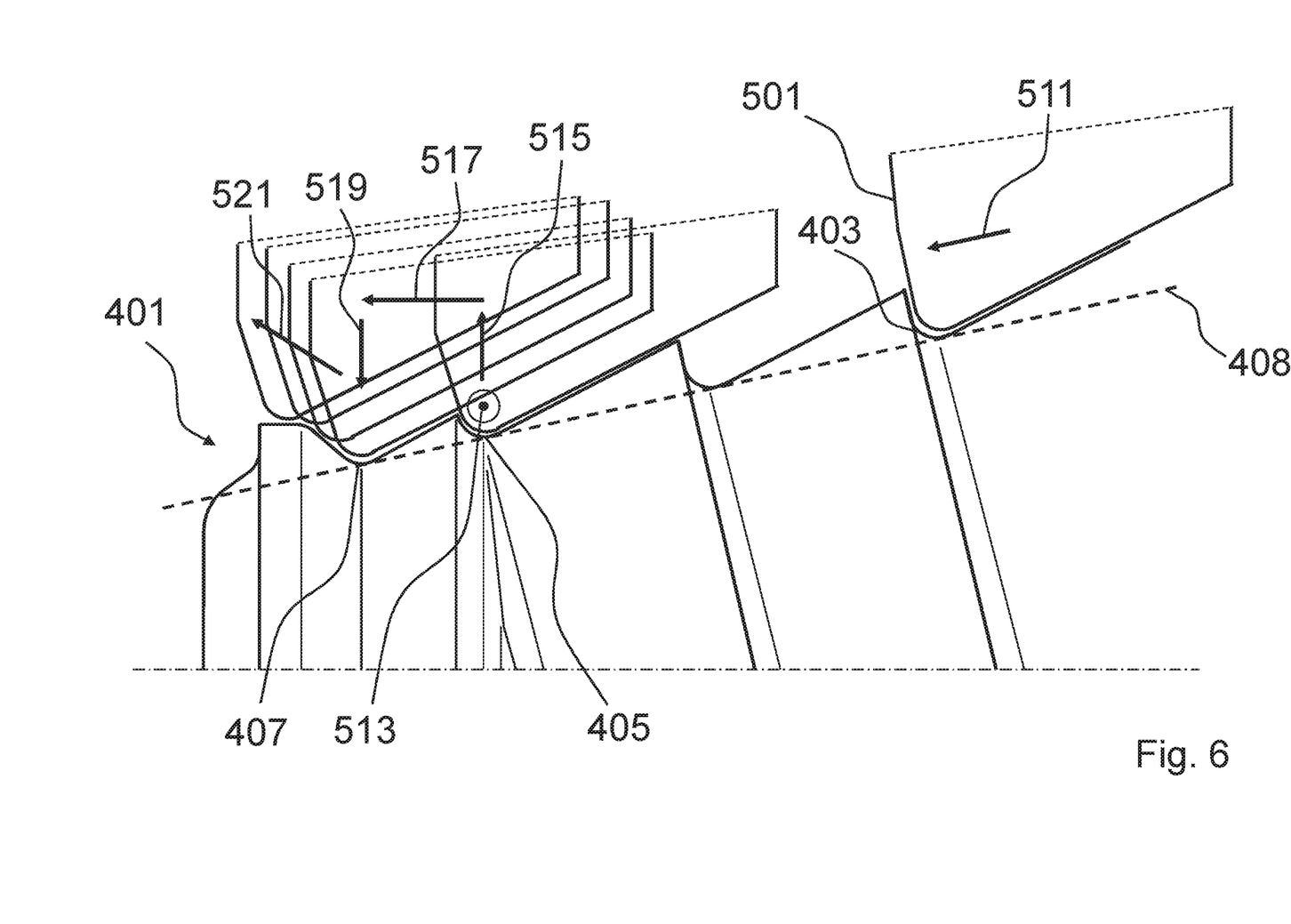

In FIG. 6 the manufacturing process of the shaped part 401 is schematically depicted. For this purpose a cutting plate 501 is used for cutting ablation of material in a basically known manner in order to generate the grooves 403, 405, and 407. To illustrate the process the cutting plate 501 is depicted superimposed in a plurality of process phases that in reality temporally follow one another. In the manufacturing process only one cutting plate 501 is used that is operated, for example, under CNC control, while the not-yet completed shaped part 401 rotates about its central axis. In addition, for better illustration the cutting plate 501 is depicted slightly spaced from the shaped part 401. In the actual process both parts are in operative contact.

To manufacture the spiral groove 403 the cutting plate 501 is initially continuously moved axially toward the free end and to a lesser degree radially inward (thus in the depiction of FIG. 5 toward lower left parallel to line 408), which is illustrated by the arrow 511. Here the shaped part rotates, with the result that the groove 403 continuously arises. At point 513 the cutting plate 501 is held for a defined time, namely that required for one revolution, in order to generate the encircling groove 405. Subsequently the cutting plate 501 is moved radially outward, which is indicated by the arrow 515. Thereafter the cutting plate 501 is moved axially leftward along the arrow 517 and moved radially inward along the arrow 519 after an established distance that then corresponds to the spacing of the webs 105 and 107 in the seal assembly. Subsequently it is moved axially leftward and radially outward along the arrow 521. The groove 407 is thereby generated.

In this manner a shaped part 401 can be produced with extremely precise geometry in a single operation using a CNC-controlled milling machine, using which shaped part 401 seal assemblies can then in turn be manufactured also with extremely exact geometry and thus high tightness and reliability.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved seal assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Seal element
3 Stiffening part
5 Elastomer part
9, 11 Seal region
13 Seal section
15 Section
17 Seal lip
21 Region
101 Line
103 Return-pumping structure
104 Groove
105, 107 Web
131 Recess
133, 135 Leg
137 Tip
106, 106' Opening
301, 303 Line
401 Injection molding
403, 405, 407 Groove
406 Elevation
408 Line
501 Cutting plate
511, 515, 517, 519, 521 Arrow
513 Point

What is claimed is:

1. A seal assembly for sealing a shaft configured to rotate in a main direction, the seal assembly comprising:
a stiffener and at least one elastomer seal member connected to the stiffener,
the elastomer seal member including a seal region having a seal section configured to seal against a shaft and seal a to-be-sealed space relative to an environment,
the seal section including a first web structure which forms a screw thread configured to pump a leakage fluid toward the to-be-sealed space when the shaft rotates in the main direction, a second web structure formed by an annular, circumferentially extending, closed rib configured to sealingly abut on the shaft at least when the shaft is not rotating, and a third web structure formed by a second annular, circumferentially extending, closed rib configured to sealingly abut on the shaft at least when the shaft is not rotating,
the second web structure is located between the first web structure and the third web structure, the second web structure is axially spaced from the third web structure to form a reservoir therebetween.

2. The seal assembly according to claim 1, wherein the reservoir is formed by an annular groove between the second web structure and the third web structure.

3. The seal assembly according to claim 1, wherein, before being installed on the shaft, the inner diameter of the first web structure decreases linearly toward a free axial end of the seal section.

4. The seal assembly according to claim 1, wherein the third web structure is located between the second web structure and a free axial end of the seal section.

5. The seal assembly according to claim 4, wherein the first web structure merges smoothly into the second web structure.

6. The seal assembly according to claim 1, wherein the second web structure is disposed between the first web structure and the third web structure.

7. The seal assembly according to claim 1, wherein an axial spacing from the second web structure to the third web structure is between forty percent (40%) and sixty percent (60%) of a pitch of the screw thread of the first web structure.

8. The seal assembly according to claim 1, wherein the screw thread of the first web structure has a substantially constant, generally triangular, cross section, the screw thread having a first flank making a first angle with the shaft and a second flank making a second angle with the shaft, the second angle being different than the first angle.

9. The seal assembly according to claim 8, wherein the first flank faces the free axial end of the seal section and the second flank faces away from the free axial end and wherein the first angle is greater than the second angle.

10. The seal assembly according to claim 9, wherein the first angle is between forty degrees (40°) and ninety degrees (90°), and the second angle is between five degrees (5°) and thirty five degrees (35°).

11. The seal assembly according to claim 8, wherein the first flank meets the second flank at a rounded tip portion of the first web.

12. The seal assembly according to claim 1,
wherein the reservoir is formed by an annular groove between the second web structure and the third web structure,
wherein, before being installed on the shaft, the inner diameter of the first web structure decreases linearly toward a free axial end of the seal section,
wherein the third web structure is located between the second web structure and the free axial end of the seal section,
wherein the first web structure merges smoothly into the second web structure,
wherein the second web structure is disposed between the first web structure and the third web structure, and
wherein an axial spacing from the second web structure to the third web structure is 40-60% of a pitch of the screw thread of the first web structure.

13. The seal assembly according to claim 12,
wherein the screw thread of the first web structure has a substantially constant, generally triangular, cross section, and has a first flank facing the free axial end of the seal section making an angle between forty degrees (40°) and ninety degrees (90°) with the shaft and a second flank facing away from the free axial end of the seal section and making an angle of between five degrees (5°) and thirty five degrees (35°) with the shaft, and wherein the first flank meets the second flank at a rounded region.

14. The seal assembly according to claim 1, wherein the second web structure comprises a continuous annular rib.

15. The seal assembly according to claim 14, wherein the third web structure comprises a continuous annular rib axially spaced from the second web structure.

16. A combination shaft and seal assembly, comprising:
a shaft;
the seal assembly of claim 1 positioned on the shaft; and
wherein the third web structure is configured to create a first radial contact pressure with the shaft and the second web structure is configured to create a second radial contact pressure with the shaft, the first radial contact pressure being less than the second radial contact pressure.

17. The combination of claim 16, wherein the first radial contact pressure is between forty percent (40%) and seventy percent (70%) smaller than the second radial contact pressure.

18. The combination of claim 17, wherein the first web structure creates a third radial contact pressure which varies along an axial length of the first web structure.

19. The combination of claim 18, wherein the third radial contact pressure is a maximum at a medial position along the axial length of the first web structure.

20. The combination of claim 19, wherein the screw thread of the first web structure has a substantially constant, generally triangular, cross section, the screw thread having a first flank making a first angle with the shaft and a second flank making a second angle with the shaft, the second angle being different than the first angle, the first flank faces the free axial end of the seal section and the second flank faces away from the free axial end and wherein the first angle is greater than the second angle, the first angle is between forty degrees (40°) and ninety degrees (90°), and the second angle is between five degrees (5°) and thirty five degrees (35°).

\* \* \* \* \*